July 31, 1956 M. B. RIGGS 2,756,800
SAFETY TIRE CONSTRUCTION
Filed Feb. 5, 1952 2 Sheets-Sheet 1
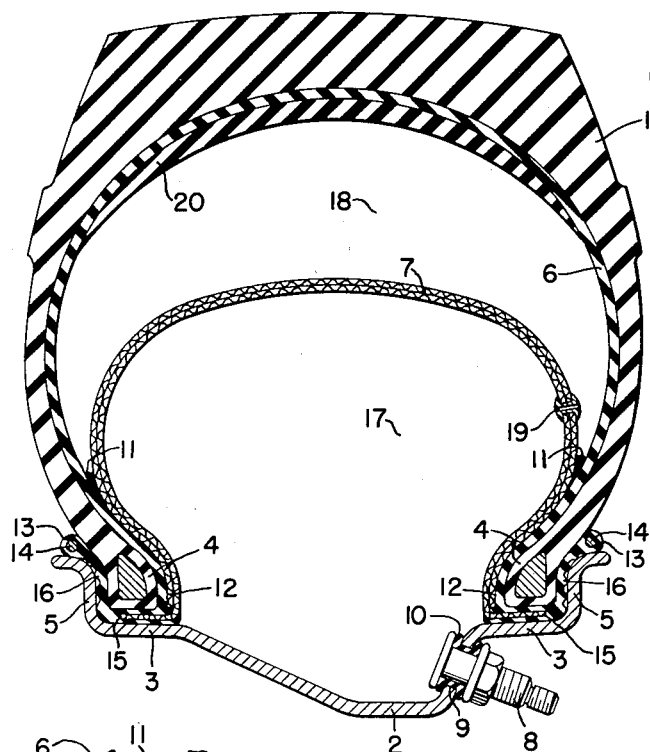
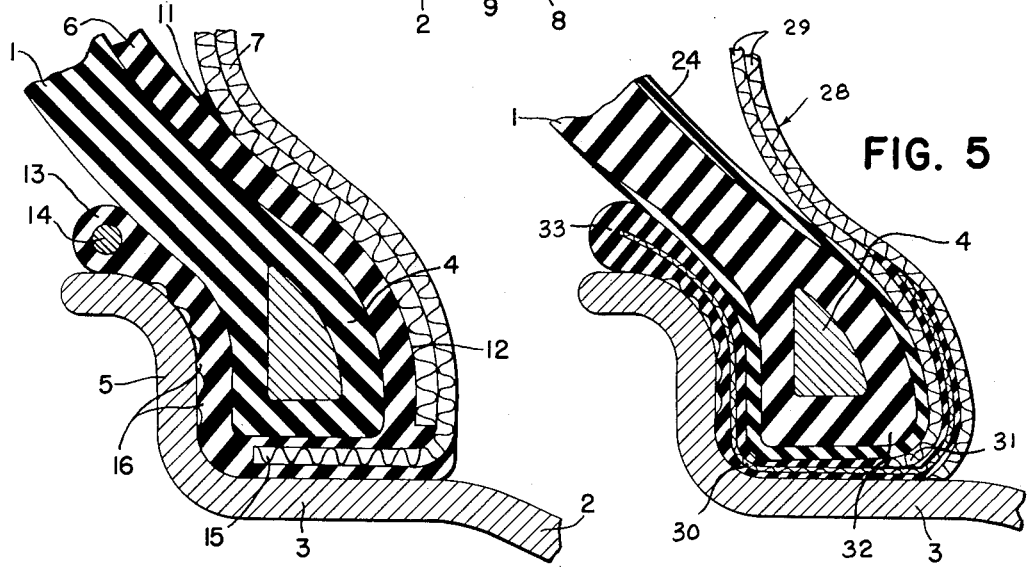
INVENTOR.
MART B. RIGGS
BY
P. L. Miller
ATTORNEY July 31, 1956  M. B. RIGGS  2,756,800
SAFETY TIRE CONSTRUCTION
Filed Feb. 5, 1952  2 Sheets—Sheet 2
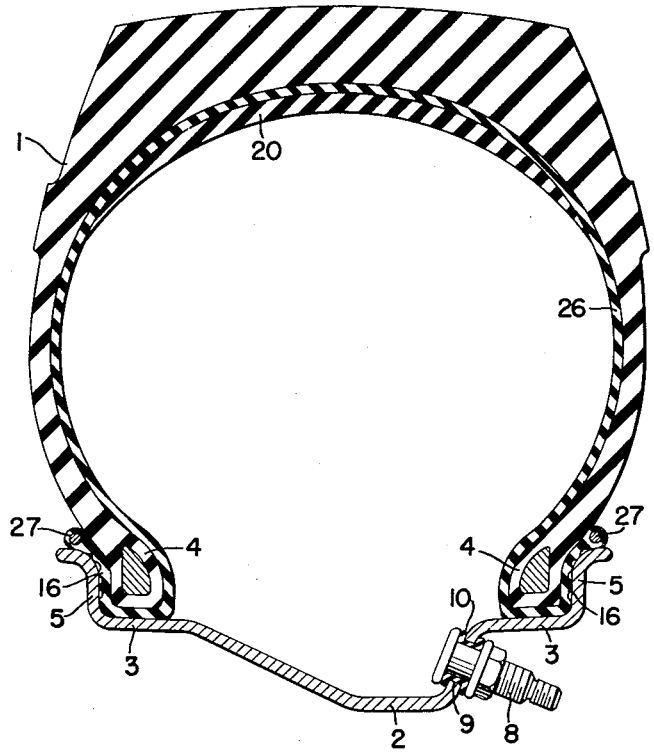
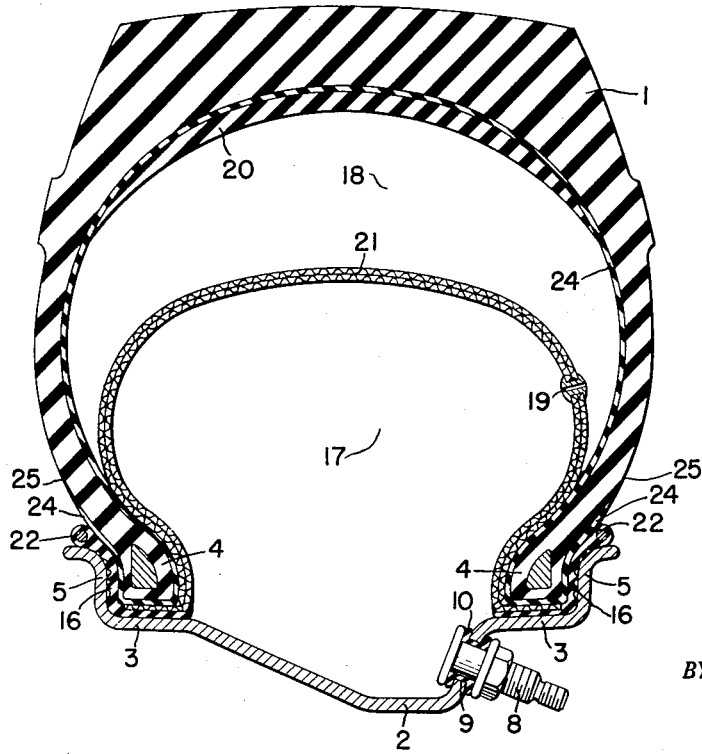
INVENTOR.
MART B. RIGGS
BY
R. L. Miller
ATTORNEY

United States Patent Office 2,756,800
Patented July 31, 1956

2,756,800

SAFETY TIRE CONSTRUCTION

Mart B. Riggs, Akron, Ohio, assignor, by mesne assignments, to The Goodyear Tire & Rubber Company, a corporation of Ohio Application February 5, 1952, Serial No. 269,936

20 Claims. (Cl. 152—342)

The present invention relates to a tubeless tire and rim construction in which an outer casing or tire is mounted on a rim which, together with an interposed diaphragm, forms an air chamber for keeping the tire distended. The invention as illustrated is adapted for use as either a single- or double-chambered tubeless tire and rim construction.

One object of this invention is to provide suitable means for locking a diaphragm in place between the tire and rim, whether used to create a single chamber or a double chamber within the tire.

Another object of this invention is to provide a diaphragm that may be releasably mounted on the tire prior to the mounting of the tire on the rim and in such a way as to assure its proper location when the tire is mounted.

A still further object of this invention is to provide means to be used either with the normal specially processed single-chambered tubeless tire or an ordinary tire to convert them into plural-chambered safety tubes, whereby if a blowout occurs and air is lost from one chamber, the air in the other chamber will sustain the tire sufficiently to bring the car to a safe stop.

Other objects of the invention will appear as the description of the invention proceeds, the novel features, arrangements and combinations being described in the specification and in the claims thereunto appended.

In the drawings:

Fig. 1 is a transverse cross-section through an assembly embodying my invention;

Fig. 2 is an enlarged fragmentary view of the lower left-hand portion of Fig. 1;

Fig. 3 is a view similar to Fig. 1 showing another form of my invention;

Fig. 4 is a view similar to Fig. 1 showing still another form of my invention;

Fig. 5 is a view similar to Fig. 2 showing a still further construction; and

Fig. 6 is a view of a diaphragm which is a modification of that shown in Fig. 5.

In Fig. 1 I have shown a tubeless safety tire created by use of a double diaphragm. An ordinary tire carcass 1, such as would normally be used with an inner tube, is mounted on a drop-center rim 2. The rim has bead seats 3 on which the beads 4 of the tire 1 normally seat and it also has side flanges 5 which prevent the beads from moving axially outward.

The ordinary tire is not constructed to retain air and normally is provided with an inflatable inner tube. Butyl rubber tubes have been found to retain air almost indefinitely and tubes of this type are now preferred. In order to make the normal tire impervious so that it can be mounted on a rim without a tube, it has been the practice to line the inner face of the tire with Butyl rubber or other impervious material. In applicant's invention it will be understood that natural rubber, Butyl rubber or other impervious or substantially impervious material may be used.

The feature of applicant's invention as shown in Fig. 1 is the provision of a double diaphragm, retained in place by the seating of the tire on the rim. One diaphragm 6, made of Butyl rubber or the like, is of a size to conform approximately to the inner surface of the tire 1, and the other diaphragm 7 is made of rubberized fabric and so constructed as to be substantially nonstretchable, as in the W. J. Lee Patent No. 2,173,065. This diaphragm 7 when in place spans the interior of the tire from bead to bead thereof in spaced relation to the inner wall of the tire and projects radially outwardly in an arched or outwardly-bowed manner to divide the tire into two chambers, one of which, the outer chamber, being formed by the two diaphragms 6 and 7 and the other, the inner chamber, by the diaphragm 7 and the rim. The rim is made impervious by locking an inflation valve 8 in an opening 9 in the rim and making an air-tight seal therewith by employing a rubber washer 10 or the like.

The diaphragms 6 and 7 are united near the bead area, with their unjoined portions starting at points 11, preferably just radially outward of the beads and rim flanges. The joined portions 12 of the diaphragms extend from the points 11, then under the tire beads and between the tire beads and rim flanges, terminating in enlarged retaining beads 13 just above the rim flanges. These beads 13 prevent the portions 12 being pulled out of position and as shown they are reenforced with annular spring wires 14 embedded in the beads. While not required in all instances, these wires materially assist in holding the diaphragm in place on the tire during mounting and dismounting of same on the rim. The diaphragms are initially molded substantially to the shape shown so as to conform to the tire when placed thereon.

As shown in Fig. 2, the fabric ends 15 of at least one ply of the fabric diaphragm extend far enough to lie between and be clamped by the beads 4 and the rim seats therefor, whereby the outward extension of the fabric diaphragm under the action of centrifugal force is resisted or when the air is lost from the outer chamber, as when a blowout occurs. More than one layer of fabric may be so extended if desired. The joined edges of the diaphragm may be provided with flexible ribs 16 to form a better air seal with the rim if desired.

The inner chamber 17, formed by diaphragm 7 and the rim 2, is inflated directly by air introduced through the valve 8, and the outer chamber 18, formed by diaphragms 6 and 7, receives air through a small perforated grommet 19 having an opening in the neighborhood of .047 inch in diameter. This opening is made purposely small to retard leakage of the air from the inner to the outer chamber when a blowout occurs, so that while the tire will eventually go flat, the air in the inner chamber will sustain the tire until the car can be brought to a safe stop. In place of the grommet one could use a valve designed to normally permit air to pass quickly from the inner to the outer chamber on inflation but which will stop or retard the flow of air from chamber 17 when a blowout destroys the outer chamber 18.

If desired, the diaphragm 6 may be provided with a layer of puncture-sealing material 20 to resist deflation caused by penetration of nails or other foreign objects through the tire 1 and diaphragm 6.

The double diaphragm is first placed on an unmounted tire in the same position as shown mounted. Then the tire and diaphragm are mounted on the rim in the usual manner for mounting a tire. The position of the beads 13 will indicate if the diaphragms are properly located after mounting. The beads 13 lie between the tire and the top of the rim on the flange and at least in part will be compressed so as to effect a further sealing at this point, as well as to indicate a proper mounting of the diaphragm.

In Fig. 4 wherein the same numerals indicate similar parts in Fig. 1, a similar tubeless safety tire is shown but in this case the outer diaphragm shown at 6 in Fig. 1 is eliminated and a single diaphragm 21, in all respects like that shown at 7 in Fig. 1 and with terminal beads 22 similar to 13 in Fig. 1, is the auxiliary element and in place of the diaphragm 6, the tire 23 is lined with an integral impervious liner 24 that covers the entire interior surface of the tire and extends around the beads to the points 25. This liner is cemented or vulcanized to the tire to form an integral part thereof. The tire operates the same as that shown in Fig. 1.

In Fig. 3 where the same numerals indicate similar parts in the other figures, I have shown a single-chambered tubeless tire formed by using an ordinary tire 1, and a single diaphragm 26 terminating in beads 27 and in all other respects being comparable to the outer diaphragm 6 in Fig. 1. It is used to convert the ordinary tire into a tubeless tire by lining it with an easily removable liner that will be properly located on the tire before it is mounted and which will retain its proper position during mounting.

In Fig. 5 I have shown a still further modification of my invention illustrating an alternative construction, particularly with respect to the fabric-reinforced diaphragm of Fig. 4. In Fig. 4 the diaphragm 21 is shown as being separate from the lining 24 whereas in Figs. 1 and 2 the diaphragm 7, which corresponds to diaphragm 21 in Fig. 4, is integrally connected to the diaphragm 6 which corresponds to 24 in Fig. 4. It is to be understood that the construction shown in Fig. 5 can be used with the modification shown in Figs. 1 and 2 in an obvious manner as will be apparent from the description of Fig. 5, since the only difference is that the fabric diaphragm in Fig. 4 is separate from the diaphragm 24 in Fig. 4, instead of being integrally connected as are diaphragms 7 and 6 in Figs. 1 and 2. It is therefore believed to be unnecessary to illustrate in another view the application of the principle employed in Fig. 5 to the invention disclosed in Figs. 1 and 2.

In Figs. 5 and 6 the same reference numerals correspond to the similar parts in the other views. The diaphragm 28 is composed of two layers of cord fabric 29 in each of which the cords are laid parallel to each other but at opposite angles with respect to the other layer and at a relatively small angle, less than 45° with respect to the circumferential center line of the diaphragm so as to reduce the permissible stretch under the action of centrifugal force. This feature is not new since it is embodied in present devices of this character. (See Lee Patent No. 2,173,065.) Of course the cord layers 29 are impregnated with rubber so as to make an air-tight chamber.

Ordinarily cotton cord is used for this purpose as it is relatively inexpensive but, on the other hand, in order to get the strength necessary in the diaphragm the cotton cords must be of appreciable thickness and therefore the diaphragm 28 will be of substantial thickness and very bulky. This increases the difficulty of mounting the tire. In Figs. 1, 2 and 4 where a cotton cord is illustrated it will be found that even one layer of the fabric is relatively thick and, since it must occupy a position between the tire bead and the rim, it will increase the difficulty of mounting the tire on the rim. It is very desirable, however, to have the edge of the fabric tie in under the bead so that the pressure of the bead against it will tend to hold the diaphragm in place and prevent the stretch or outward movement of the diaphragm under the action of centrifugal force or under the internal air pressure within the inner chamber after a blowout occurs.

In order to overcome this bulkiness I have found that I can use a layer of high-strength material 30 (see Fig. 5) which is very thin and place this between the plies of fabric 29 and have it overlap the layers 29 a considerable distance as illustrated. This fabric then extends underneath the bead and between the bead and the rim flange so that strength is imparted, not only to the part of the diaphragm beneath the bead and to the free portion within the tire, but also to the portion lying between the rim flange and the bead. It will be noted that the innermost layer of fabric 29 has a portion 31 lying underneath the toe of the bead where it is possible to have some bulkiness without interfering particularly with the mounting of the tire since the toe 32 of the bead will yield somewhat in a radial direction and in view of the fact that the bead seat on the rim usually slopes slightly toward the drop-center portion thereof. The layer of fabric 30 is preferably square-woven nylon fabric impregnated with rubber. Preferably, as shown in Fig. 6, I employ two layers of this nylon fabric in the diaphragm 28, each layer 30 being approximately .004″ in thickness so that with two layers of nylon there is only approximately .008 inch of fabric and on top of this and incorporated with it is sufficient rubber or synthetic rubber to increase the thickness to about .020 inch, making a total thickness of .028 inch between the surfaces of the diaphragm which lie between the tire and the rim. Both layers 30 overlap the cotton layers 29 and have their edges arranged therebetween. It is preferred that at least most of the rubber be placed between the layers of nylon fabric although the outer surfaces should have a sufficient coating of rubber to prevent abrasion of the fabric by any relative movement between the tire bead and rim. This thickness of the two layers of nylon plus that of the rubber is still well under the thickness of a layer of cotton cord fabric and the required amount of rubber on the opposite sides of same as illustrated in the forms of the invention shown in Figs. 1, 2 and 4.

It is to be understood that it is not absolutely necessary to have the outer layer of fabric 29 extend under the bead as at 31 but this is preferred. It is also within the scope of the invention to have the inner layer of material 29 extend under the toe of the bead in the manner illustrated in Fig. 2 in connection with the inner layer of fabric of the diaphragm 7 shown in Fig. 2. However the construction shown in Fig. 5 is preferred. The outer edges of the diaphragm may be provided with beads 33 as in the other figures.

Other high-strength fabrics besides nylon may be used for this purpose as long as its strength is sufficient for the required purposes and its thickness is not appreciably more than that of the nylon for the same strength.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. A diaphragm for use in combination with an open-bellied tire having beaded edges and a rim having tire bead receiving seats and outwardly extending tire retaining flanges at the outer edges thereof on which said tire is mounted, comprising an outwardly-bowed annular portion for spanning the space between the beaded edges of the tire throughout the peripheral extent thereof and having extensions integral therewith for separably holding said diaphragm in place between the tire and rim, said outwardly-bowed annular portion being smaller in outer diameter than the inner wall of the tire with which it is to be mounted but larger than the rim diameter, whereby to divide the space between the tire and rim into two air-receiving chambers and said extensions comprising generally axially extending portions on the outwardly-bowed annular portion at each of the opposite edges thereof for mounting between the beaded edges of the tire and adjacent rim seats and having at their outer edges generally radially extending portions adapted to lie between the beaded edges of the tire and the rim flanges and being of a relatively compressible material for sealing the space between the rim flanges and the tire beads, the said radially extending portions having enlarged beads which when mounted with said tire and rim, lie at least in part above the rim flanges to engage the outer edges thereof, said enlarged beads being greater in thickness than the portions radially inwardly thereof which are adapted to lie between the rim flanges and the beads of the tire, whereby the enlarged beads will be restrained against movement into the spaces between the rim flanges and the beaded edges of the tire.

2. A diaphragm as claimed in claim 1 in which the outwardly-bowed portion is substantially inextensible peripherally thereof.

3. A diaphragm as claimed in claim 1 in which the enlarged beads are reinforced to make them peripherally inextensible.

4. A diaphragm as claimed in claim 1 in which the diaphragm is reinforced by fabric constructed and arranged to make said diaphragm substantially inextensible peripherally, said fabric extending throughout the diaphragm and into the radially extending portions of the extensions.

5. A diaphragm as claimed in claim 1 in which the diaphragm is reinforced by fabric constructed and arranged to make said diaphragm substantially inextensible peripherally, said fabric extending throughout the diaphragm and into the radially extending portions of the extensions and into the enlarged beads.

6. A device as set forth in claim 1 in which the enlarged beads are each reinforced by a substantially inextensible wire extending circumferentially.

7. A device as set forth in claim 1 in which the enlarged beads are each reinforced by a substantially inextensible spring wire extending circumferentially.

8. A device as set forth in claim 1 in which the radially extending portions of said extensions are each provided with at least one peripherally extending sealing rib on a face thereof arranged inwardly of said enlarged bead.

9. A device as set forth in claim 1 in which the diaphragm is provided with means for restricting the flow of air from one side of the diaphragm to the other.

10. A diaphragm as set forth in claim 1 in which said diaphragm is substantially inextensible peripherally and in which a second diaphragm of outwardly-bowed annular form is arranged exteriorly of said first diaphragm and has its lateral edges joined to said first diaphragm at the lateral sides of said first diaphragm to form with said first diaphragm an air-receiving chamber.

11. A diaphragm as claimed in claim 1 in which said diaphragm is substantially inextensible peripherally and in which a second diaphragm of outwardly-bowed annular form is arranged exteriorly of said first diaphragm and has its lateral edges joined to said first diaphragm at the lateral sides thereof to form with said first diaphragm an air-receiving chamber, said second diaphragm having a shape substantially that of the adjacent surface of the inner wall of the tire when mounted therewith.

12. A diaphragm as claimed in claim 1 in which the outwardly-bowed portion is reinforced with at least one layer of substantially inextensible but flexible material and the extensions are similarly reinforced with flexible material bonded to said first material in overlapping relation, the reinforcing material in said extensions being of lesser thickness than the material in said outwardly-bowed portion and having a greater tensile strength, for the same thickness, than the reinforcing material in said outwardly-bowed portion.

13. A diaphragm as set forth in claim 12 in which the reinforcing material in the outwardly-bowed portion is reinforced by two superimposed layers of reinforcing material, the outer edges of each of said latter layers overlapping the edges of the reinforcing material in the extensions on opposite sides thereof.

14. A diaphragm as set forth in claim 12 in which the reinforcing material in the lateral extensions extend upwardly into the enlarged beads.

15. In the combination of an open-belled tire having beaded edges, a rim having tire bead receiving seats and outwardly extending tire retaining flanges at the outer edges thereof on which said tire is mounted, and a diaphragm lying between the tire and rim and forming with the rim an air chamber, that improvement in the diaphragm which comprises an outwardly-bowed annular portion spanning the space between the beaded edges of the tire throughout the peripheral extent thereof and having extensions integral therewith for separably holding said diaphragm in place between the tire and rim, said outwardly-bowed annular portion being smaller in outer diameter than the inner wall of the tire with which it is to be mounted but larger than the rim diameter, whereby to divide the space between the tire and rim into two air-receiving chambers and said extensions comprising generally axially extending portions on the outwardly-bowed annular portion at each of the opposite edges thereof, said axially extending portions being arranged between the beaded edges of the tire and adjacent rim seats and having at their outer edges generally radially extending portions lying between the beaded edges of the tire and the rim flanges and being of a relatively compressible material for sealing the space between the rim flanges and the tire beads, the said radially extending portions having enlarged beads lying at least in part above the rim flanges, to engage the outer edges thereof and being greater in thickness above the rim flanges than the portions lying between the rim flanges and the beads if the tire, whereby the enlarged beads are restrained against movement into the spaces between the rim flanges and the beaded edges of the tire.

16. The combination set forth in claim 15 in which said diaphragm is substantially inextensible peripherally and in which a second diaphragm of outwardly-bowed annular form is arranged outside of said first diaphragm and has its lateral edges joined to said first diaphragm at the lateral sides of said first diaphragm to form with said first diaphragm an air-receiving chamber.

17. The combination set forth in claim 15 in which said diaphragm is substantially inextensible peripherally and in which a second diaphragm of outwardly-bowed annular form is arranged outside of said first diaphragm and has its lateral edges joined to said first diaphragm at the lateral sides of said first diaphragm to form with said first diaphragm an air-receiving chamber, said second diaphragm being of a size and shape substantially that of the adjacent surface of the inner wall of the tire when mounted therewith.

18. The combination set forth in claim 15 in which said diaphragm is substantially inextensible peripherally and in which a second diaphragm of outwardly-bowed annular form is arranged outside of said first diaphragm and has its lateral edges joined to said first diaphragm at the lateral sides of said first diaphragm to form with said first diaphragm an air-receiving chamber, said second diaphragm being of a size and shape substantially that of the inner wall of the tire with which it is to be used and said first diaphragm having means for restricting the flow of air from one side of the diaphragm to the other.

19. A diaphragm for use in combination with an open-bellied tire having beaded edges and a rim having tire bead mounting means on which said tire is mounted including outwardly extending tire retaining flanges at the outer edges thereof, comprising an outwardly-bowed annular portion for spanning the space between the beaded edges of the tire throughout the peripheral extent thereof and having lateral extensions integral therewith for separably holding said diaphragm in place between the tire and rim, said outwardly-bowed annular portion being smaller in outer diameter than the inner wall of the tire with which it is to be mounted but larger than the rim diameter, whereby to divide the space between the tire and rim into two air receiving chambers and said extensions comprising portions on the outwardly-bowed annular portion at each of the opposite edges thereof for mounting between the beaded edges of the tire and said adjacent tire bead mounting means and including at their outer edges portions adapted to lie between the beaded edges of the tire and said retaining flanges and being of a relatively compressible material for sealing the space between the rim flanges and the tire beads, the said latter portions having enlarged beads which, when mounted with said tire and rim, lie at least in part above the rim flanges to engage the outer edges thereof, said enlarged beads being greater in thickness than the portions radially inwardly thereof which are adapted to lie between the rim flanges and the beads of the tire, whereby the enlarged beads will be restrained against movement into the spaces between the rim flanges and the beaded edges of the tire.

20. In the combination of an open-bellied tire having beaded edges, a rim having tire bead mounting means on which said tire is mounted including outwardly extending tire retaining flanges at the outer edges thereof, and a diaphragm lying between the tire and rim and forming with the rim an air chamber, that improvement in the diaphragm which comprises an outwardly-bowed annular portion spanning the space between the beaded edges of the tire throughout the peripheral extent thereof and having lateral extensions integral therewith for separably holding said diaphragm in place between the tire and rim, said outwardly-bowed annular portion being smaller in outer diameter than the inner wall of the tire with which it is to be mounted but larger than the rim diameter, whereby to divide the space between the tire and rim into two air-receiving chambers and said extensions comprising portions on the outwardly-bowed annular portion at each of the opposite edges thereof mounted between the beaded edges of the tire and said adjacent tire bead mounting means and including at their outer edges portions lying between the beaded edges of the tire and said retaining flanges and being of relatively compressible material for sealing the space between the rim flanges and the tire beads, the said latter portions having enlarged beads thereon lying at least in part above the rim flanges to engage the outer edges thereof, said enlarged beads being greater in thickness above the rim flanges than the portions radially inward thereof between the rim flanges and the beads of the tire, whereby the enlarged beads are restrained against movement into the spaces between the rim flanges and the beaded edges of the tire.

References Cited in the file of this patent

UNITED STATES PATENTS

| | | |
|---|---|---|
| 1,653,054 | Mack | Dec. 20, 1927 |
| 1,923,975 | Harlan | Aug. 22, 1933 |
| 2,074,284 | Stevenson | Mar. 16, 1937 |
| 2,173,065 | Lee | Sept. 12, 1939 |
| 2,200,916 | Crowley | May 14, 1940 |
| 2,410,209 | Godsey | Oct. 29, 1946 |
| 2,530,213 | Sutton | Nov. 14, 1950 |
| 2,560,609 | Van Hulzen | July 17, 1951 |
| 2,587,470 | Herzegh | Feb. 26, 1952 |
| 2,606,135 | Iknayan | Aug. 5, 1952 |
| 2,698,042 | Perkins | Dec. 28, 1954 |

FOREIGN PATENTS

| | | |
|---|---|---|
| 658,465 | Great Britain | Oct. 10, 1951 |
| 122,731 | Australia | July 22, 1944 |

OTHER REFERENCES

Tires Service Station, page 36, vol. XXXII, No. 7, February 1951.